United States Patent
Wang et al.

(10) Patent No.: US 10,154,128 B2
(45) Date of Patent: Dec. 11, 2018

(54) METHODS AND APPARATUSES FOR INTERPRETING A PHONE NUMBER

(71) Applicant: Beijing Xiaomi Mobile Software Co., Ltd., Haidian District, Beijing (CN)

(72) Inventors: Shuo Wang, Beijing (CN); Xiehao Bao, Beijing (CN); Wankun Yang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 10 days.

(21) Appl. No.: 15/408,529

(22) Filed: Jan. 18, 2017

(65) Prior Publication Data
US 2017/0289326 A1    Oct. 5, 2017

(30) Foreign Application Priority Data
Mar. 31, 2016  (CN) .......................... 2016 1 0201552

(51) Int. Cl.
| H04M 1/57 | (2006.01) |
| H04M 1/725 | (2006.01) |
| H04M 1/2745 | (2006.01) |
| H04M 3/42 | (2006.01) |

(52) U.S. Cl.
CPC ..... H04M 1/575 (2013.01); H04M 1/274533 (2013.01); H04M 1/72552 (2013.01); H04M 3/42042 (2013.01); H04M 3/42059 (2013.01)

(58) Field of Classification Search
CPC ............ H04M 1/575; H04M 1/274533; H04L 12/587
See application file for complete search history.

(56) References Cited

U.S. PATENT DOCUMENTS 9,508,054 B2 * 11/2016 Brady .................... G06Q 10/08
2006/0046720 A1  3/2006 Toropainen et al.
(Continued)

FOREIGN PATENT DOCUMENTS

CN   104378745 A   2/2015
CN   105049580 A   11/2015
(Continued)

OTHER PUBLICATIONS

International Search Report and Written Opinion issued in corresponding International Application No. PCT/CN2016/097213, dated Dec. 23, 2016, 11 pages.
(Continued)

Primary Examiner — Myron K Wyche
(74) Attorney, Agent, or Firm — Arch & Lake LLP

(57) ABSTRACT

Methods and apparatuses are provided for interpreting a phone number in the field of information technology. The method includes: determining whether contact information of a phone number is stored in an address book if receiving a call; searching a message with content containing the phone number when it is determined that the contact information of the phone number is not stored in the address book; obtaining predetermined type information from the content of the message, in which the predetermined type information at least includes name information; and displaying the name information as the contact information of the phone number on a display interface of the call.

17 Claims, 5 Drawing Sheets

(56) References Cited

U.S. PATENT DOCUMENTS

| | | | |
|---|---|---|---|
| 2007/0133771 A1* | 6/2007 | Stifelman | H04M 3/48 379/142.01 |
| 2008/0134081 A1 | 6/2008 | Jeon et al. | |
| 2010/0138441 A1* | 6/2010 | Ryu | H04M 1/72552 707/769 |
| 2012/0196575 A1* | 8/2012 | Hymel | H04L 12/587 455/412.2 |
| 2012/0322471 A1 | 12/2012 | Wang | |
| 2014/0297439 A1* | 10/2014 | Hasson | G06Q 20/10 705/21 |
| 2016/0098699 A1* | 4/2016 | Pandey | G06Q 20/10 705/44 |

FOREIGN PATENT DOCUMENTS

| | | |
|---|---|---|
| CN | 105430146 A | 3/2016 |
| CN | 105872230 A | 8/2016 |
| EP | 1784970 A1 | 5/2007 |
| EP | 2206246 A2 | 7/2010 |

OTHER PUBLICATIONS

Extended European Search Report issued in corresponding EP Application No. 16199839, dated Apr. 11, 2017, 11 pages.

* cited by examiner

| determining whether contact information of a phone number is stored in an address book if a call is received     101 |
|---|

↓

| searching a message with content containing the phone number when it is determined that the contact information of the phone number is not stored in the address book   102 |
|---|

↓

| identifying predetermined type information from the content of the message, wherein the predetermined type information at least includes name information   103 |
|---|

↓

| displaying the name information as the contact information of the phone number on a display interface of the smart device   104 |
|---|

FIG. 1A

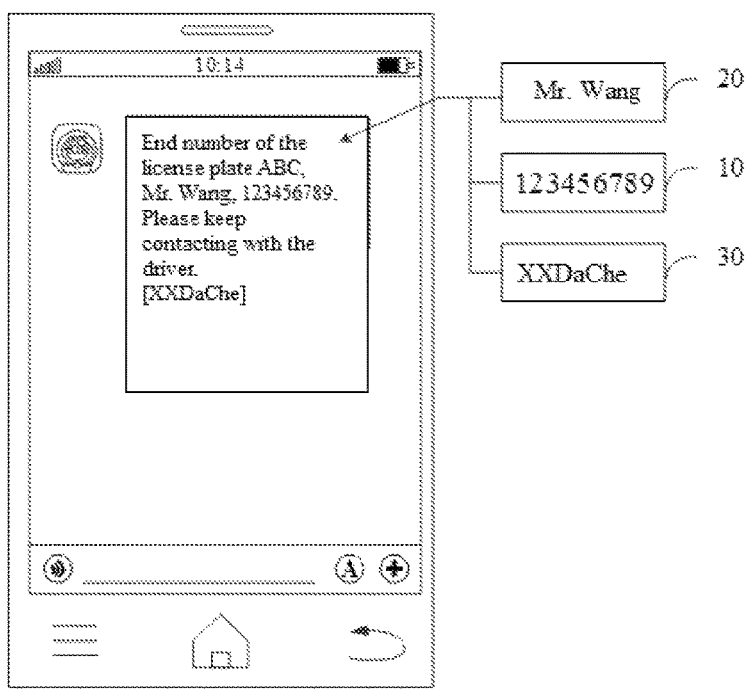

FIG. 1B

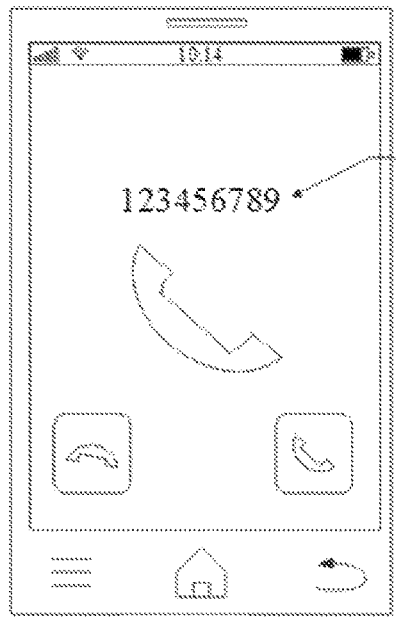

FIG. 1C

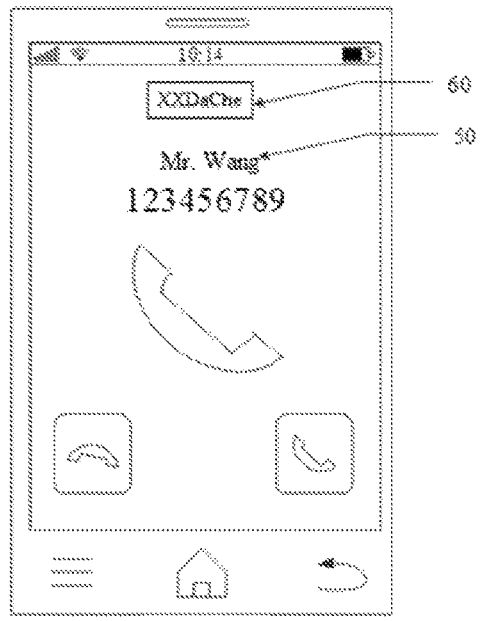

FIG. 1D the merchant identifier corresponding to the sending account of the message is determined according to a correspondence between sending accounts the merchant identifiers
103a a merchant identifier in a pre-stored merchant identifier list is matched one by one with a character string in the determined message to determine the merchant identifier in the message
103b the name information in the message is identified according to the message template corresponding to the merchant identifier
103c

FIG. 1E

METHODS AND APPARATUSES FOR INTERPRETING A PHONE NUMBER

CROSS REFERENCE TO RELATED APPLICATION

This application is based upon and claims a priority to Chinese Patent Application Serial 201610201552.8, filed with the Status Intellectual Property Office of P. R. China on Mar. 31, 2016, the entire contents of which are incorporated herein by reference.

TECHNICAL FIELD

The present disclosure relates to the field of information technology, and more particularly to a method and an apparatus for interpreting a phone number.

BACKGROUND

As a call application has an advantage of instant and convenient communication, a usage of the call application is comparatively frequent in people's daily life.

Generally, if receiving a call, a call device may search contact information corresponding to a phone number from an address book firstly, and then it displays the phone number and the searched contact information on a call interface. For a phone number less frequently used, the phone number or the contact information of the phone number is not stored in the address book. Only the phone number may be displayed on a call interface of the call device in such a case. It causes that a user owning the call device cannot acquire the contact information of the phone number so as to choose to neglect or reject the call.

SUMMARY

Embodiments of the present disclosure provide a method and an apparatus for interpreting a phone number. Technical solutions are as follows.

According to a first aspect of the present disclosure, a method for interpreting a phone number is provided. The method includes: determining whether contact information of a phone number is stored in an address book when receiving a call; searching a message with content containing the phone number when it is determined that the contact information of the phone number is not stored in the address book; obtaining predetermined type information from the content of the message, in which the predetermined type information at least includes name information; displaying the name information as the contact information of the phone number on a display interface of the call. The method may be implemented by a smart device.

According to a second aspect of embodiments of the present disclosure, there is provided a device for interpreting a phone number. The device may be implemented in a smart device and includes: a processor; and a memory configured to store an instruction executable by the processor. The processor is configured to: determine whether contact information of a phone number is stored in an address book when receiving a call; search a message with content containing the phone number when it is determined that the contact information of the phone number is not stored in the address book; obtain predetermined type information from the content of the message, in which the predetermined type information at least includes name information; and display the name information as the contact information of the phone number on a display interface of the call.

According to a third aspect of embodiments of the present disclosure, a non-transitory computer-readable storage medium is provided. The non-transitory computer-readable storage medium has stored therein instructions that, when executed by a processor of a device, causes the device to perform acts including: determining whether contact information of a phone number is stored in an address book if receiving a call; searching a message with content containing the phone number if it is determined that the contact information of the phone number is not stored in the address book; obtaining predetermined type information from the content of the message, in which the predetermined type information at least includes name information; and displaying the name information as the contact information of the phone number on a display interface of the call.

It is to be understood that, both the foregoing general description and the following detailed description are exemplary and explanatory only and are not restrictive of the present disclosure.

BRIEF DESCRIPTION OF THE DRAWINGS

The accompanying drawings herein are incorporated in and become parts of the specification, illustrate embodiments consistent with the disclosure and, together with the description, serve to explain the principles of the disclosure.

FIG. 1A is a flow chart showing a method for interpreting a phone number according to an exemplary embodiment;

FIG. 1B is a schematic diagram illustrating obtaining predetermined type information from content of a message according to an exemplary embodiment;

FIG. 1C is a schematic diagram illustrating displaying contact information on a display interface of a call according to one or more exemplary embodiments;

FIG. 1D is a schematic diagram illustrating displaying contact information on a display interface of a call according to one or more exemplary embodiments;

FIG. 1E is a flow chart showing a method for obtaining predetermined type information from content of a message according to another exemplary embodiment;

DETAILED DESCRIPTION

Figure 1F:
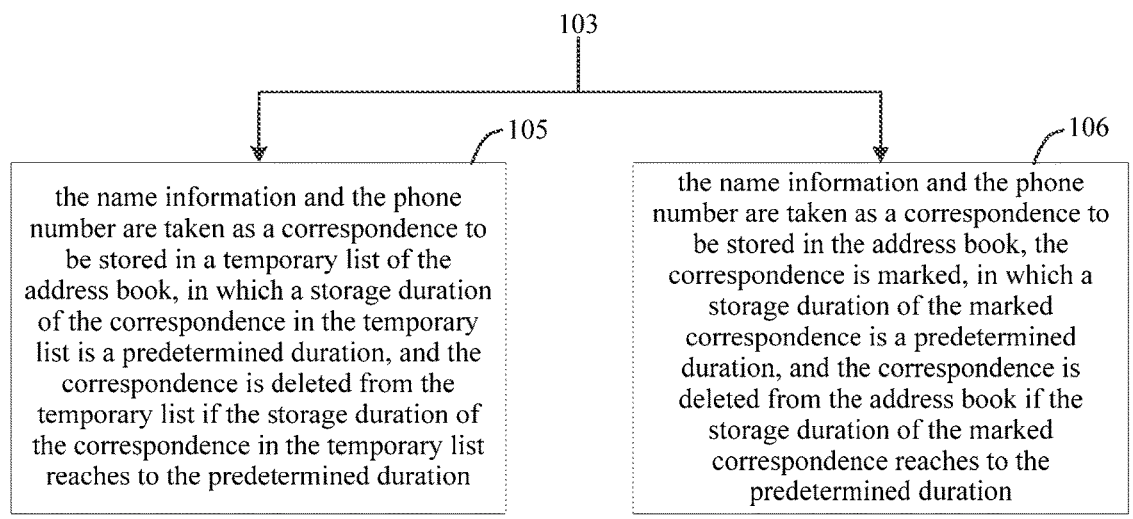
FIG. 1F is a flow chart showing a method for storing a correspondence of name information and a phone number according to an exemplary embodiment.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Generally, a user may not memorize a phone number of a contact. When a call of a contact is received, a smart device may acquire contact information of a phone number according to an address book and display the contact information on a call interface such that the user may obtain a user of the call according to the displayed contact information. Generally, the user owning the smart device may determine a call as a harassing call or an advertisement call so as to reject it if only the phone number is displayed on the call interface without the contact name. Therefore, it is desirable to display the name information of the phone number. In order to make the user know an object of a phone number which is not stored, the smart device may display the phone number and the name information obtained from content of a message corresponding to the phone number on the call screen when the call is received. Thus, the smart device may automatically interpret the phone number using information stored locally on the smart phone or remotely in a database accessible to the smart phone. A method for interpreting a phone number will be described referring to FIG. 1A to FIG. 1D in the following.

FIG. 1A is a flow chart showing a method for interpreting a phone number according to an exemplary embodiment. As shown in FIG. 1, the method for interpreting a phone number includes followings.

In block 101, it is determined whether contact information of a phone number is stored in an address book if a call is received.

In block 102, a message with content containing the phone number is searched when it is determined that the contact information of the phone number is not stored in the address book.

In order to determine the contact information corresponding to the phone number, the smart device detects whether there is stored contact information of the phone number firstly using the address book, after receiving the call.

It is indicated that a user does not store the phone number, when it is determined that the contact information of the phone number is not stored in the address book. In an actual application, it is possible that the smart device receives a message related to a strange number before a call of the strange number. Therefore, the smart device may search a message with content containing the phone number in order to acquire information related to the phone number as far as possible.

Alternatively or additionally, the message with content containing the phone number is searched from historical messages satisfying a predetermined condition. The historical messages satisfying the predetermined condition are messages of which reception time is in a predetermined period of time before the call.

For example, the predetermined period of time may be set as 5 minutes. In this case, all messages received by the smart device within 5 minutes before call time are messages satisfying the predetermined condition.

Alternatively or additionally, the message with content containing the phone number is searched from historical messages satisfying a predetermined condition. The historical messages satisfying the predetermined condition may include messages sent from sending accounts located in a white list.

The described white list herein is configured to store sending accounts of lawful merchants. The accounts in the white list may be acquired online by the smart device, or may be input by the user. An acquiring method of the accounts in the white list is not limited in the embodiment.

In block 103, predetermined type information is obtained from the content of the message, in which the predetermined type information at least includes name information.

The smart device may detect whether the contact information of the phone number is stored in the address book if receiving a call, and may search the message with content containing the phone number and may obtain the name information corresponding to the phone number from the content of the message.

The described name information herein may include at least one of: a merchant identifier, a name identifier, a surname identifier, and the like. The specific content of the name information is not limited in embodiments.

Taking an example to illustrate, it is assumed that messages received by the smart device in 5 minutes from call time are the messages satisfying the predetermined condition. Content of a message A received by the smart device is: "End number of the license plate ABC, Mr. Wang, 123456789. Please keep contacting with the driver", after 2 minutes from the received message A, the smart device receives a call of a phone number 123456789. Then the smart device may take the received messages in 5 minutes from the call time as the messages satisfying the predetermined condition. As time of receiving the message A is in the predetermined period of time, the smart device may take the message A as the message satisfying the predetermined condition. The smart device then may obtain the name information "Mr. Wang" corresponding to the phone number 123456789 from the content of the message A after determining the calling number 123456789 is contained in the content of the message A.

Alternatively or additionally, the predetermined type information further includes the merchant identifier. The merchant identifier related to the message may be taken as a portion of the predetermined type information.

The described merchant identifier herein is configured to uniquely label the sending account of the message. Generally, the merchant identifier is a common name of the merchant. In order to provide a message service, the merchant generally may register a proprietary account and may send a related message to the user by the proprietary account. For example, a merchant identifier corresponding to a common sending account "95319" is Bank of JiangSu. For another example, a merchant identifier corresponding to a sending account "10001" is China Telecom. Examples herein are merely to illustrate a correspondence between a merchant identifier, a merchant and a sending account in daily life. Whether the sending account, the merchant and the merchant identifier in the examples satisfy an actual condition is not used to limit an explanation and a scope of embodiments of the present disclosure.

In order to make the user explicitly know from which merchant identifier whose corresponding sending account sends the message the name information is obtained, the smart device may also obtain the merchant identifier corresponding to the sending account of the message from the message with content containing the phone number, in addition to obtaining the name information from the message with content containing the phone number.

FIG. 1B is a schematic diagram illustrating obtaining predetermined type information from content of a message according to an exemplary embodiment. As shown in FIG. 1B, the content of the message A received by the smart device is "End number of the license plate ABC, Mr. Wang, 123456789. Please keep contacting with the driver. [XX-DaChe]." The smart device then may obtain the name information 20 "Mr. Wang" corresponding to the phone number 10 "123456789" and the merchant identifier 30 "XXDaChe" from the content of the message A, after determining that the phone number 123456789 is contained in the content of the message A.

In block 104, the name information is taken as the contact information of the phone number to be displayed on a display interface of the call.

Alternatively or additionally, the merchant identifier is added to the contact information of the phone number to be displayed on the display interface of the call.

FIG. 1C is a schematic diagram illustrating displaying contact information on a display interface of a call according to one or more exemplary embodiments. As shown in FIG. 1C, generally, when receiving a call of a phone number, the smart device may display the phone number 40 of the call only on a call interface, when no contact information of the phone number is stored on the smart device.

FIG. 1D is a schematic diagram illustrating displaying contact information on a display interface of a call according to one or more exemplary embodiments. When receiving the call of the phone number, the smart device may add read name information 50 and a merchant identifier 60 to the contact information of the phone number to display the contact information on the call interface when receiving the message containing the phone number "End number of the license plate ABC, Mr. Wang, 123456789. Please keep contacting with the driver. [XX DaChe]" in a predetermined period of time before the call.

As described above, with the method for interpreting a phone number provided in embodiments of the present disclosure, by searching the message with content containing the phone number when receiving the call, obtaining the name information form the content of the message, and displaying the name information as the contact information of the phone number on the display interface of the call, the call device may display the phone number and the name information corresponding to the phone number read from the content of the message on the call interface if receiving the call, thus, it may solve a problem that a user owning the call device cannot acquire the contact information of the call so as to choose to neglect or reject the call. The problem is caused by that only the phone number is displayed on the call interface of the call device, for a call of not being stored the phone number or contact information of the phone number. It achieves an effect that the contact information of the phone number may be automatically displayed on the call interface such that the user may know an object of the phone number, for the call of being not stored the phone number or the contact information of the phone number.

In the embodiment, the merchant identifier is displayed on the call interface such that the user may explicitly know from which merchant identifier whose corresponding sending account sends the message the name information is obtained.

In the embodiment, the message only sent by the sending account in the white list is searched such that all content read by the smart device is from the lawful merchant.

In a possible implementation, as the content of the message send by the merchant is mainly based on a firm message template, in order to preciously obtain the name information from the content of the message, the smart device may extract the name information located at a fixed position using the message template. As a message sent by a different merchant is based on a different message template, the smart device may determine a sending account of the message in at least two manners so as to determine a required message template for obtaining the content of the message. FIG. 1E is a flow chart showing a method for obtaining predetermined type information from content of a message according to another exemplary embodiment. As shown in FIG. 1E, obtaining predetermined type information from the content of the message includes followings. The block 103 in FIG. 1A may include the following 103a to 103c.

In block 103a, the merchant identifier corresponding to the sending account of the message is determined according to a correspondence between sending accounts and merchant identifiers.

The smart device may search the correspondence between sending accounts and merchant identifiers online or locally; or the smart device may pre-store the correspondence between sending accounts and merchant identifiers.

The smart device may determine the merchant identifier corresponding to the sending account of the message according to the correspondence between sending accounts and merchant identifiers read from relevant application data pre-selected by the smart device. The pre-selected application data may include text messages, emails, notifications, or other messages from one or more approved application running on the smart device. For example, the smart device may determine the merchant identifiers based on emails from a particular store, a delivery company, or a service provide, etc. Thus, the delivery person's phone number will be determined to be associated with the delivery company. When the delivery person makes phone call to the smart device for the first time, the phone number will be shown as associated with the delivery company.

In block 103b, a merchant identifier in a pre-stored merchant identifier list is matched one by one with a character string in the determined message to determine the merchant identifier in the message.

In addition to determining the merchant identifier corresponding to the sending account of the message according to the correspondence between sending accounts and merchant identifiers, the smart device may also determine the merchant identifier corresponding to the sending account of the message according to the pre-stored merchant identifier list.

After receiving the message, the smart device may match the merchant identifier in the merchant identifier list with the character string in the received message satisfying the predetermined condition one by one to determine the merchant identifier contained in the content of the message.

For example, there are merchant identifiers "XBao", "XMi" and "XXDaChe" in the merchant identifier list pre-stored by the smart device. When receiving a message A with the content "End number of the license plate ABC, Mr. Wang, 123456789. Please keep contacting with the driver. [XXDaChe]", the smart device may match the merchant identifiers "XBao", "XMi" and "XXDaChe" with a character string in the content of the received message one by one to determine the merchant identifier "XXDaChe" contained in the content of the message.

In block 103c, the name information in the message is obtained according to the message template corresponding to the merchant identifier.

The smart device may determine the message template corresponding to the merchant identifier after determining the merchant identifier corresponding to the received message. And the smart device may extract information of a name location from the content of the message to obtain the name information in the name location according to the message template corresponding to the merchant identifier.

Taking an example to illustrate, it is assumed that a message template of a merchant identifier "XXDaChe" is: "End number of the license plate MMM, Mr./Ms. N, YYYYYYYY. Please keep contacting with the driver. [XXDaChe]." Then a regulation of reading the message template is: "Y" to be a phone number, "Mr. /Ms. N" to be name information, and "XXDaChe" to be a merchant identifier. Thus, the smart device may search the message template corresponding to the merchant identifier "XXDaChe" and the regulation of reading the message template online or locally after receiving a message send by the merchant with the merchant identifier "XXDaChe." Then, the smart device may preciously obtain the name information in the received message according to the message template and the regulation of reading the message template corresponding to "XXDaChe."

In the embodiment, by determining the merchant identifier via the correspondence between sending accounts and merchant identifiers or via matching the character string in the content of the message, the message template corresponding to the merchant identifier may be determined, and then the smart device may preciously obtain the name information in the content of the message using the message template.

In another possible implementation, when determining the message containing the phone number and then obtaining the name information corresponding to the phone number, the smart device takes the obtained name information and the phone number as a correspondence to store the correspondence in the address book. The smart device may directly acquire the correspondence related to the phone number from the address book to display it on the call interface if receiving a call of the phone number. However, in order to avoid an influence of an undesired correspondence on using the address book by the user and avoid consumption of storage space of the smart device by a lot of correspondences, the smart device may regularly delete a temporary stored correspondence between the name information and the phone number. FIG. 1F is a flow chart showing a method for storing a correspondence of name information and a phone number according to an exemplary embodiment. As shown in FIG. 1F, the method for storing the correspondence of the name information and the phone number includes followings.

In block 105, the name information and the phone number are taken as a correspondence to be stored in a temporary list of the address book. A storage duration of the correspondence in the temporary list is a predetermined duration. The correspondence is deleted from the temporary list if the storage duration of the correspondence in the temporary list reaches to the predetermined duration.

If receiving a message sent by a merchant, the smart device may obtain the name information in the message from the message containing the phone number according to the message template corresponding to the merchant identifier after determining the merchant identifier of the merchant according to the sending account of the merchant. The smart device takes the name information and the phone number as the correspondence to store the correspondence in the temporary list of the address book. The smart device may directly display the name information corresponding to the phone number on the call interface according to the correspondence in the temporary list if receiving a call of the phone number.

The described temporary list herein is a non-permanent list for storing the correspondence between the name information and the phone number. The smart device may delete the correspondence from the temporary list if the storage duration of the correspondence in the temporary reaches to the predetermined duration.

Alternatively or additionally, the smart device may empty the correspondence in the temporary list once every a predetermined period of time or per a predetermined time.

In a possible implementation, the correspondence between the phone number and the name information is transferred from the temporary list to a non-temporary list of the address book, if a number of communications between the phone number and the smart device reaches to a predetermined threshold and the storage duration does not reach to the predetermined duration.

For a phone number high frequently contacted, the smart device may automatically retain the correspondence corresponding to the phone number.

The number of communications may include at least one following numbers or a sum of at least two following numbers: a number of incoming calls from the phone number, a number of outgoing calls to the phone number, a number of incoming messages sent by the phone number, and a number of outgoing messages sent to the phone number.

Taking an example to illustrate, when a preset threshold of a phone number is 5 times, the smart device may transfer the correspondence between the phone number "123456789" and the name information from the temporary list to the nor-temporary list of the address book if the number of communications between the phone number "123456789" and the smart device reaches to 5 times and the storage duration does not reach to the predetermined duration.

In block 106, the name information and the phone number are taken as a correspondence to be stored in the address book, the correspondence is marked, in which a storage duration of the marked correspondence is a predetermined duration, and the correspondence is deleted from the address book if the storage duration of the marked correspondence reaches to the predetermined duration.

In addition to setting the temporary list in the address book, the smart device may also represent the stored correspondence to be temporary by marking the stored correspondence in the address book. The storage duration of the marked correspondence is the predetermined duration. The smart device deletes the correspondence from the address book if the storage duration of the marked correspondence reaches to the predetermined duration.

Alternatively or additionally, the smart device deletes the marked correspondence once every a predetermined period of time or per a predetermined time.

In a possible implementation, the mark of the correspondence between the phone number and the name information is removed if the number of communications between the phone number and the smart device reaches to the predetermined threshold and the storage duration does not reach to the predetermined duration.

The number of communications includes at least one following numbers or a sum of at least two following numbers: a number of incoming calls from the phone number, a number of outgoing calls to the phone number, a number of incoming messages sent by the phone number, and a number of outgoing messages sent to the phone number.

It is to be illustrated that, the described predetermined duration in the block 105 and the block 106 may be 5 minutes, 10 minutes, 15 minutes and the like. The range of the predetermined duration is not limited in the embodiment.

In the embodiment, by deleting the temporary stored correspondence between the name information and the phone number, it may avoid an influence of an undesired correspondence on using the address book by the user and may avoid consumption of storage space of the smart device by a lot of correspondences.

In the embodiment, for a phone number high frequently contacted, the smart device automatically retains the correspondence corresponding to the phone number. It may save a process of storing by the user the phone number high frequently contacted.

Followings are apparatus embodiments of the present disclosure, configured to execute the method embodiments of the present disclosure. For details being not disclosed in the apparatus embodiments of the present disclosure may refers to the method embodiments of the present disclosure.

Figure 2A:
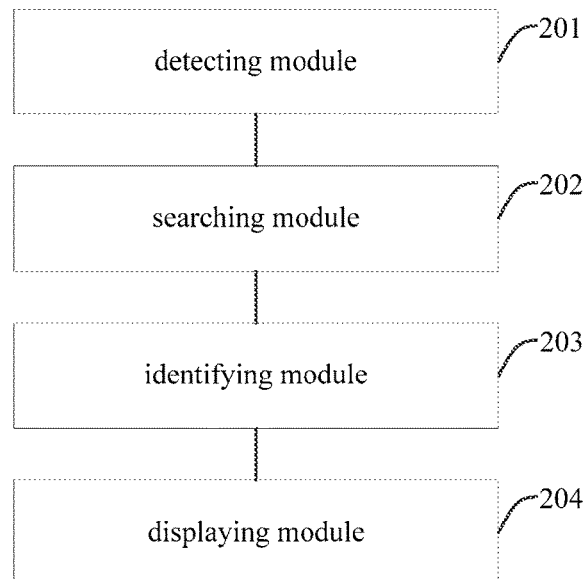
FIG. 2A is a block diagram of an apparatus for interpreting a phone number according to an exemplary embodiment.

FIG. 2A is a block diagram of an apparatus for interpreting a phone number according to an exemplary embodiment. As shown in FIG. 2A, the apparatus for interpreting a phone number includes, but is not limited to, a detecting module 201, a searching module 202, an obtaining module 203 and a displaying module 204.

The detecting module 201 is configured to determine whether contact information of a phone number is stored in an address book if receiving a call.

The searching module 202 is configured to search a message with content containing the phone number when it is determined that the contact information of the phone number acquired by the detecting module 201 is not stored in the address book.

In order to determine the contact information corresponding to the phone number, the smart device detects whether there is stored contact information of the phone number firstly using the address book, after receiving the call.

It is indicated that a user does not store the phone number, when it is determined that the contact information of the phone number is not stored in the address book. In an actual application, it is possible that the smart device receives a message related to a strange number before a call of the strange number. Therefore, the smart device may search a message with content containing the phone number in order to acquire information related to the phone number as far as possible.

Alternatively or additionally, the message with content containing the phone number is searched from historical messages satisfying a predetermined condition. The historical messages satisfying the predetermined condition are messages of which reception time is in a predetermined period of time before the call.

Alternatively or additionally, the message with content containing the phone number is searched from historical messages satisfying a predetermined condition. The historical messages satisfying the predetermined condition may include messages sent from accounts located in a white list.

The described white list herein is configured to store sending accounts of lawful merchants. The accounts in the white list may be acquired online by the smart device, or may be input by the user. An acquiring method of the accounts in the white list is not limited in the embodiment.

The obtaining module 203 is configured to obtain predetermined type information from the content of the message determined by the searching module 202, in which the predetermined type information at least includes name information.

The smart device may detect whether the contact information of the phone number is stored in the address book if receiving a call, and may search the message with content containing the phone number and may obtain the name information corresponding to the phone number from the content of the message.

The described name information herein may be a merchant identifier, a name identifier, a surname identifier and the like. The specific content of the name information is not limited in the embodiment.

Alternatively or additionally, the predetermined type information further includes the merchant identifier. The merchant identifier related to the message may be taken as a portion of the predetermined type information.

The described merchant identifier herein is configured to uniquely label the sending account of the message. Generally, the merchant identifier is a common name of the merchant. In order to provide a message service, the merchant generally may register a proprietary account and may send a related message to the user by the proprietary account. For example, a merchant identifier corresponding to a common sending account "95319" is Bank of JiangSu. For another example, a merchant identifier corresponding to a sending account "10001" is China Telecom. Examples herein are merely to illustrate a correspondence between a merchant identifier, a merchant and a sending account in daily life. Whether the sending account, the merchant and the merchant identifier in the examples satisfy an actual condition is not used to limit an explanation and a scope of embodiments of the present disclosure.

In order to make the user explicitly know from which merchant identifier whose corresponding sending account sends the message the name information is obtained, the smart device may also obtain the merchant identifier corresponding to the sending account of the message from the message with content containing the phone number, in addition to obtaining the name information from the message with content containing the phone number.

The displaying module 204 is configured to display the name information read by the obtaining module 203 as the contact information of the phone number on a display interface of the call.

Alternatively or additionally, the merchant identifier is added to the contact information of the phone number to be displayed on the display interface of the call.

Figure 2B:
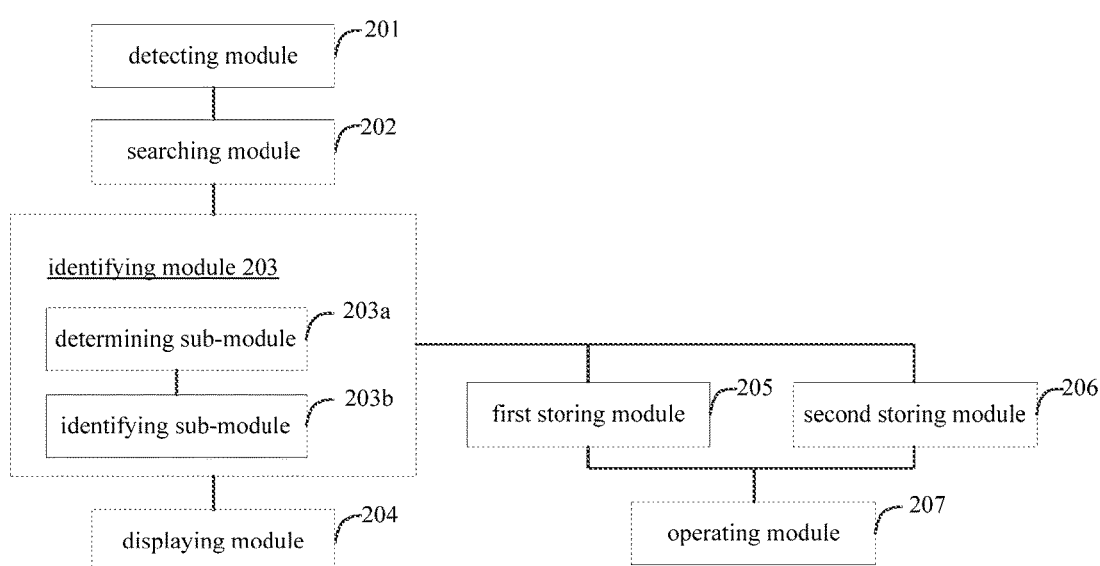
FIG. 2B is a block diagram of an apparatus for interpreting a phone number according to another exemplary embodiment.

In another possible implementation, with reference to FIG. 2B which is a block diagram of an apparatus for interpreting a phone number according to another exemplary embodiment. As shown in FIG. 2B, the obtaining module 203 includes a determining sub-module 203*a* and an obtaining sub-module 203*b*.

The determining sub-nodule 203*a* is configured to determine a merchant identifier corresponding to a sending account of the message according to a correspondence between sending accounts and merchant identifiers, or to match a merchant identifier in a pre-stored merchant identifier list with a character string in the determined message one by one to determine a merchant identifier in the message.

The smart device may search the correspondence between sending accounts and merchant identifiers online or locally; or the smart device may pre-store the correspondence between sending accounts and merchant identifiers.

The smart device may determine the merchant identifier corresponding to the sending account of the message according to the read correspondence between sending accounts and the merchant identifiers.

In addition to determining the merchant identifier corresponding to the sending account of the message according to the correspondence between sending accounts and merchant identifiers, the smart device may also determine the merchant identifier corresponding to the sending account of the message according to the pre-stored merchant identifier list.

After receiving the message, the smart device may match the merchant identifier in the merchant identifier list with the character string in the received message satisfying the predetermined condition one by one to determine the merchant identifier contained in the content of the message.

The obtaining sub-module 203*b* is configured to obtain the name information in the message according to a message template corresponding to the merchant identifier determined by the determining sub-module 203.

The smart device may determine the message template corresponding to the merchant identifier after determining the merchant identifier corresponding to the received message. And the smart device may extract information of a name location from the content of the message to obtain the name information in the name location according to the message template corresponding to the merchant identifier.

In a possible implementation in FIG. 2B, the predetermined type information further includes the merchant identifier, the obtaining module 203 is configured to: take the merchant identifier related to the message as a portion of the predetermined type information.

In a possible implementation in FIG. 2B, the searching module is further configured to: search the message with content containing the phone number from historical messages satisfying a predetermined condition, in which the historical messages satisfying the predetermined condition are messages of which reception time is in a predetermined period of time before the call, or historical messages from sending accounts located in a white list, in which the white list is configured to store sending accounts of lawful merchants.

In a possible implementation in FIG. 2B, the apparatus further includes: a first storing module 205 and a second storing module 206.

The first storing module 205 is configured to take the name information read by the obtaining module 203 and the phone number acquired by the detecting module 201 as a correspondence, to store the correspondence in a temporary of the address book, in which a storage duration of the correspondence in the temporary list is a predetermined duration, and to delete the correspondence from the temporary list if the storage duration of the correspondence in the temporary list reaches to the predetermined duration.

If receiving a message sent by a merchant, the smart device may obtain the name information in the message from the message containing the phone number according to the message template corresponding to the merchant identifier after determining the merchant identifier of the merchant according to the sending account of the merchant. The smart device takes the name information and the phone number as the correspondence to store the correspondence in the temporary list of the address book. The smart device may directly display the name information corresponding to the phone number on the call interface according to the correspondence in the temporary list if receiving a call of the phone number.

The described temporary list herein is a non-permanent list for storing the correspondence between the name information and the phone number. The smart device may delete the correspondence from the temporary list if the storage duration of the correspondence in the temporary reaches to the predetermined duration.

Alternatively or additionally, the smart device may empty the correspondence in the temporary list once every a predetermined period of time or per a predetermined time.

The second storing module 206 is configured to take the name information read by the obtaining module 203 and the phone number acquired by the detecting module 201 as a correspondence, to store the correspondence in the address book, to mark the correspondence, in which a storage duration of the marked correspondence is the predetermined duration, and to delete the correspondence from the address book if the storage duration of the marked correspondence reaches to the predetermined duration.

In addition to setting the temporary list in the address book, the smart device may also represent the stored correspondence to be temporary by marking the stored correspondence in the address book. The storage duration of the marked correspondence is the predetermined duration. The smart device deletes the correspondence from the address book if the storage duration of the marked correspondence reaches to the predetermined duration.

Alternatively or additionally, the smart device deletes the marked correspondence once every a predetermined period of time or per a predetermined time.

In a possible implementation in FIG. 2B, the apparatus further includes: an operating module 207. The operating module 207 is configured to transfer the correspondence between the phone number and the name information from the temporary list to a non-temporary list of the address book or to remove the mark of the correspondence between the phone number and the name information, if a number of communications between the phone number and the smart device reaches to a predetermined threshold and the storage duration does not reach to the predetermined duration.

The number of communications may include at least one of the following numbers: a number of incoming calls from the phone number, a number of outgoing calls from the smart device to the phone number, a number of incoming messages sent by the phone number, and a number of outgoing messages from the smart device to the phone number. Additionally or alternatively, the number of communications may be a sum of at least two of the above times.

For a phone number high frequently contacted, the smart device may automatically retain the correspondence corresponding to the phone number.

As described above, with the apparatus for interpreting a phone number provided in embodiments of the present disclosure, by searching the message with content containing the phone number if receiving the call, obtaining the name information form the content of the message, and displaying the name information as the contact information of the phone number on the display interface of the call, the call device may display the phone number and the name information corresponding to the phone number read from the content of the message on the call interface if receiving the call, thus, it may solve a problem that a user owning the call device cannot acquire the contact information of the call so as to choose to neglect or reject the call. The problem is caused by that only the phone number is displayed on the call interface of the call device, for a call of not being stored the phone number or contact information of the phone number. It achieves an effect that the contact information of the phone number may be automatically displayed on the call interface such that the user may know an object of the phone number, for the call of being not stored the phone number or the contact information of the phone number.

In the embodiment, by determining the merchant identifier via the correspondence between sending accounts and merchant identifiers or via matching the character string in the content of the message, the message template corresponding to the merchant identifier may be determined, and then the smart device may preciously obtain the name information in the content of the message using the message template.

In the embodiment, the merchant identifier is displayed on the call screen such that the user may explicitly know from which merchant identifier whose corresponding sending account sends the message the name information is obtained.

In the embodiment, the message only sent by the sending account in the white list is searched such that all content read by the smart device is from the lawful merchant.

In the embodiment, by deleting the temporary stored correspondence between the name information and the phone number, it may avoid an influence of an undesired correspondence on using the address book by the user and may avoid consumption of storage space of the smart device by a lot of correspondences.

In the embodiment, for a phone number high frequently contacted, the smart device automatically retains the correspondence corresponding to the phone number. It may save a process of storing by the user the phone number high frequently contacted.

A device for interpreting a phone number is provided in an exemplary embodiment of the present disclosure. The device may realize the method for interpreting a phone number provided in the embodiments of the present disclosure. The device for interpreting a phone number includes a processor and a memory configured to store an instruction executable by the processor;
in which the processor is configured to
determine whether contact information of a phone number is stored in an address book if receiving a call;
search a message with content containing the phone number if it is determined that the contact information of the phone number is not stored in the address book;
obtain predetermined type information from the content of the message, in which the predetermined type information at least includes name information; and
display the name information as the contact information of the phone number on a display interface of the call.

Figure 3:
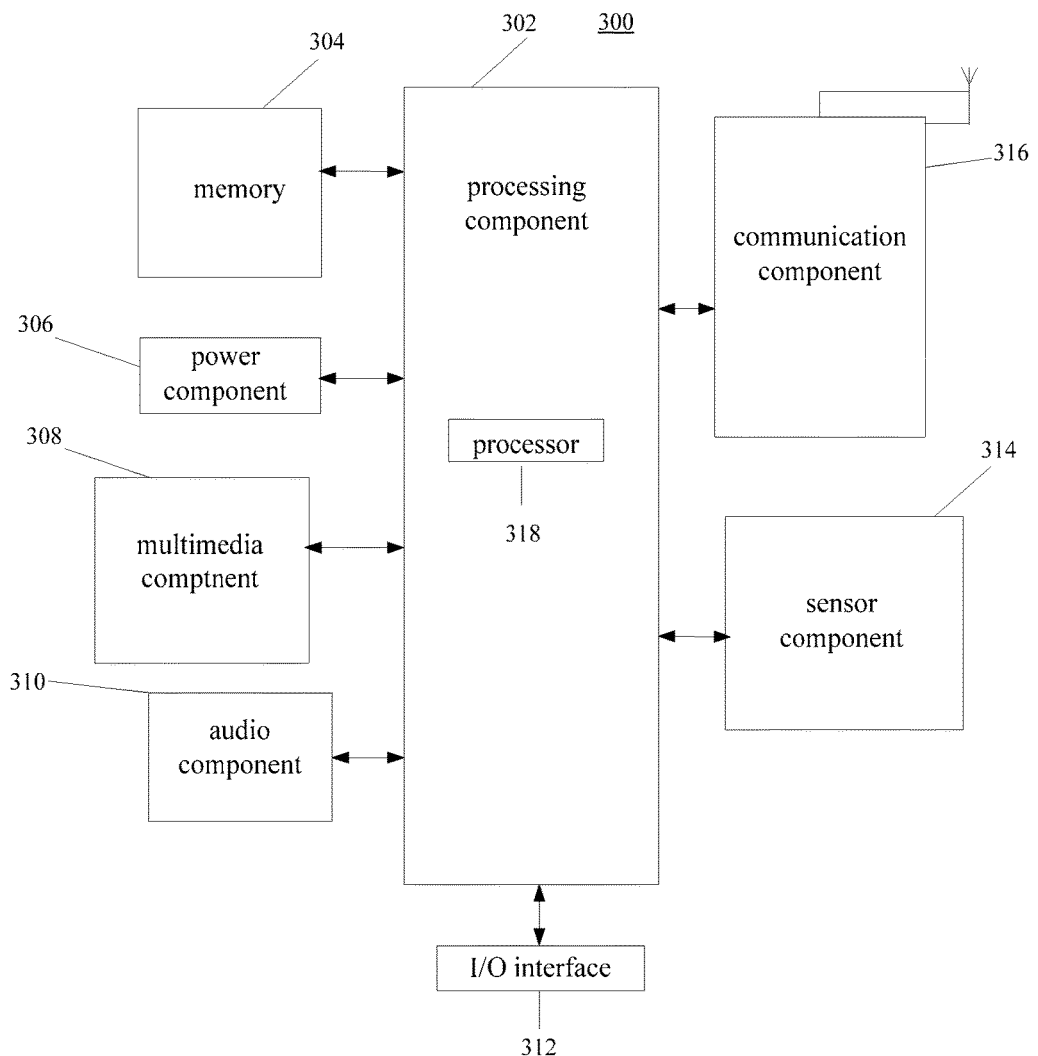
FIG. 3 is a block diagram of a device for interpreting a phone number according to an exemplary embodiment.

FIG. 3 is a block diagram of a device for interpreting a phone number according to an exemplary embodiment. For example, a device 300 may be a smart device with a call function. The smart device may be a mobile phone, a computer, a digital broadcasting terminal, a messaging terminal, a game console, a tablet device, a medical device, fitness equipment, a Personal Digital Assistant PDA, and the like.

Referring to FIG. 3, the device 300 may include the following one or more components: a processing component 302, a memory 304, a power component 306, a multimedia component 308, an audio component 310, an Input/Output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 318 to execute instructions to perform all or part of the acts in the above described methods. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a press panel (TP). If the screen includes the press panel, the screen may be implemented as a press screen to receive input signals from the user. The press panel includes one or more press sensors to sense presses, swipes, and other gestures on the press panel. The press sensors may not only sense a boundary of a press or swipe action, but also sense a duration time and a pressure associated with the press or swipe action. In some embodiments, the multimedia component 308 includes a front camera and/or a rear camera. The front camera and/or the rear camera may receive external multimedia data while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface for the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For example, the sensor component 314 may detect an open/closed status of the device 300 and relative positioning of components (e.g. the display and the keypad of the device 300). The sensor component 314 may also detect a change in position of the device 300 or of a component in the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate wired or wireless communication between the device 300 and other devices. The device 300 can access a wireless network based on a communication standard, such as WIFI, 2G, or 3G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module may be implemented based on a radio frequency identifier (RFID) technology, an infrared data association (IrDA) technology, an ultra-wideband (UWB) technology, a Bluetooth (BT) technology, and other technologies.

In exemplary embodiments, the device 300 may be implemented with one or more circuitries, which include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The device 300 may use the circuitries in combination with the other hardware or software components for performing the above described methods. Each module, sub-module, unit, or sub-unit disclosed above may be implemented at least partially using the one or more circuitries.

In exemplary embodiments, there is also provided a non-transitory computer readable storage medium including instructions, such as the memory 304 including instructions. The above instructions are executable by the processor 318 in the device 300, for performing the above described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It is to be understood that, the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A method, comprising:
    determining, by a smart device, whether contact information of a phone number is stored in an address book when receiving a call;
    when the contact information of the phone number is not stored in the address book, searching, by the smart device, a message with a content containing the phone number from historical messages satisfying a predetermined condition, wherein the historical messages satisfying the predetermined condition include at least one of: messages received within a predetermined period of time before the call, and historical messages from sending accounts located in a white list, wherein the white list is configured to store sending accounts of lawful merchants;
    when the message with the content containing the phone number is searched from the historical messages satisfying the predetermined condition, extracting, by the smart device, predetermined type information from the content of the message obtained from the historical messages, wherein the predetermined type information comprises name information; and
    displaying the name information as the contact information of the phone number on a display interface of the smart device.

2. The method according to claim 1, wherein obtaining predetermined type information from the content of the message comprises:
    determining a merchant identifier corresponding to a sending account of the message according to a correspondence between sending accounts and merchant identifiers; and
    obtaining the name information in the message according to a message template corresponding to the merchant identifier.

3. The method according to claim 1, wherein obtaining predetermined type information from the content of the message comprises:
    matching a merchant identifier in a pre-stored merchant identifier list with a character string in the message one by one to determine a merchant identifier in the message; and
    obtaining the name information in the message according to a message template corresponding to the merchant identifier.

4. The method according to claim 1, wherein the predetermined type information further comprises a merchant identifier, and obtaining predetermined type information from the content of the message further comprises:
taking the merchant identifier related to the message as a portion of the predetermined type information.

5. The method according to claim 1, further comprising at least one of:
taking the name information and the phone number as a correspondence, storing the correspondence in a temporary list of the address book, wherein a storage duration of a correspondence in the temporary list is a predetermined duration, and deleting the correspondence from the temporary list when the storage duration of the correspondence in the temporary list reaches to the predetermined duration; and
taking the name information and the phone number as the correspondence, storing the correspondence in the address book, marking the correspondence, wherein a storage duration of the marked correspondence is a predetermined duration, and deleting the correspondence from the address book when the storage duration of the marked correspondence reaches to the predetermined duration.

6. The method according to claim 5, further comprising:
transferring the correspondence between the phone number and the name information from the temporary list to a non-temporary list of the address book or removing the mark of the correspondence between the phone number and the name information, when a number of communications between the phone number and the smart device reaches to a predetermined threshold and the storage duration does not reach to the predetermined duration,
wherein the number of communications includes at least one of the following numbers: a number of incoming calls from the phone number, a number of outgoing calls to the phone number, a number of incoming messages sent by the phone number, and a number of outgoing messages to the phone number.

7. A device, comprising:
a processor; and
a memory configured to store an instruction executable by the processor;
wherein the processor is configured to:
determine whether contact information of a phone number is stored in an address book when receiving a call;
when the contact information of the phone number is not stored in the address book, search a message with a content containing the phone number from historical messages satisfying a predetermined condition, wherein the historical messages satisfying the predetermined condition include at least one of: messages received within a predetermined period of time before the call, and historical messages from sending accounts located in a white list, wherein the white list is configured to store sending accounts of lawful merchants;
when the message with the content containing the phone number is searched from the historical messages satisfying the predetermined condition, extract predetermined type information from the content of the message obtained from the historical messages, wherein the predetermined type information at least comprises name information; and
display the name information as the contact information of the phone number on a display interface of the call.

8. The device according to claim 7, wherein the processor is configured to obtain predetermined type information from the content of the message by acts of:
determining a merchant identifier corresponding to a sending account of the message according to a correspondence between sending accounts and merchant identifiers; and
obtaining the name information in the message according to a message template corresponding to the merchant identifier.

9. The device according to claim 7, wherein the processor is configured to obtain predetermined type information from the content of the message by acts of:
matching a merchant identifier in a pre-stored merchant identifier list with a character string in the message one by one to determine a merchant identifier in the message; and
obtaining the name information in the message according to a message template corresponding to the merchant identifier.

10. The device according to claim 7, wherein the predetermined type information further comprises a merchant identifier, and the processor is configured to obtain predetermined type information from the content of the message by an act of:
taking the merchant identifier related to the message as a portion of the predetermined type information.

11. The device according to claim 7, wherein the processor is further configured to perform at least one of following acts:
taking the name information and the phone number as a correspondence, storing the correspondence in a temporary list of the address book, wherein a storage duration of a correspondence in the temporary list is a predetermined duration, and deleting the correspondence from the temporary list if the storage duration of the correspondence in the temporary list reaches to the predetermined duration; and
taking the name information and the phone number as the correspondence, storing the correspondence in the address book, marking the correspondence, wherein a storage duration of the marked correspondence is a predetermined duration, and deleting the correspondence from the address book if the storage duration of the marked correspondence reaches to the predetermined duration.

12. The device according to claim 11, wherein the processor is further configured to:
transfer the correspondence between the phone number and the name information from the temporary list to a non-temporary list of the address book or remove the mark of the correspondence between the phone number and the name information, when a number of communications between the phone number and the device reaches to a predetermined threshold and the storage duration does not reach to the predetermined duration,
wherein the number of communications includes at least one of the following numbers: a number of incoming calls from the phone number, a number of outgoing calls to the phone number, a number of incoming messages sent by the phone number, and a number of outgoing messages to the phone number.

13. A non-transitory computer-readable storage medium having stored therein instructions that, when executed by a processor of a device, causes the device to perform acts comprising:

determining whether contact information of a phone number is stored in an address book when receiving a call;

when the contact information of the phone number is not stored in the address book, searching a message with a content containing the phone number from historical messages satisfying a predetermined condition, wherein the historical messages satisfying the predetermined condition include at least one of: messages received within a predetermined period of time before the call, and historical messages from sending accounts located in a white list, wherein the white list is configured to store sending accounts of lawful merchants;

when the message with the content containing the phone number is searched from the historical messages satisfying the predetermined condition, extracting predetermined type information from the content of the message obtained from the historical messages, wherein the predetermined type information at least comprises name information; and displaying the name information as the contact information of the phone number on a display interface of the call.

14. The non-transitory computer-readable storage medium according to claim 13, wherein obtaining predetermined type information from the content of the message comprises:

determining a merchant identifier corresponding to a sending account of the message according to a correspondence between sending accounts and merchant identifiers, or matching a merchant identifier in a pre-stored merchant identifier list with a character string in the message one by one to determine a merchant identifier in the message; and obtaining the name information in the message according to a message template corresponding to the merchant identifier.

15. The non-transitory computer-readable storage medium according to claim 13, wherein the predetermined type information further comprises a merchant identifier, and obtaining predetermined type information from the content of the message further comprises:

taking the merchant identifier related to the message as a portion of the predetermined type information.

16. The non-transitory computer-readable storage medium according to claim 13, wherein the acts further comprise at least one of following:

taking the name information and the phone number as a correspondence, storing the correspondence in a temporary list of the address book, wherein a storage duration of a correspondence in the temporary list is a predetermined duration, and deleting the correspondence from the temporary list if the storage duration of the correspondence in the temporary list reaches to the predetermined duration; and taking the name information and the phone number as a correspondence, storing the correspondence in the address book, marking the correspondence, wherein a storage duration of the marked correspondence is a predetermined duration, and deleting the correspondence from the address book if the storage duration of the marked correspondence reaches to the predetermined duration.

17. The non-transitory computer-readable storage medium according to claim 16, wherein the acts further comprise:

transferring the correspondence between the phone number and the name information from the temporary list to a non-temporary list of the address book or removing the mark of the correspondence between the phone number and the name information, when a number of communications between the phone number and the device reaches to a predetermined threshold and the storage duration does not reach to the predetermined duration;

wherein the number of communications includes at least one of the following numbers: a number of incoming calls from the phone number, a number of outgoing calls to the phone number, a number of incoming messages sent by the phone number, and a number of outgoing messages to the phone number.

* * * * *